(12) United States Patent
Sato

(10) Patent No.: US 10,065,681 B2
(45) Date of Patent: Sep. 4, 2018

(54) VEHICLE LOWER SECTION STRUCTURE

(71) Applicant: TOYOTA JIDOSHA KABUSHIKI KAISHA, Toyota-shi (JP)

(72) Inventor: Kenji Sato, Ichinomiya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/264,832

(22) Filed: Sep. 14, 2016

(65) Prior Publication Data

US 2017/0106911 A1 Apr. 20, 2017

(30) Foreign Application Priority Data

Oct. 19, 2015 (JP) ................................. 2015-205881

(51) Int. Cl.
*B60J 7/00* (2006.01)
*B62D 21/15* (2006.01)
*B62D 25/20* (2006.01)

(52) U.S. Cl.
CPC ....... *B62D 21/155* (2013.01); *B62D 25/2018* (2013.01)

(58) Field of Classification Search
CPC .............. B62D 25/2036; B62D 25/025; B62D 25/2018; B62D 25/082; B62D 21/152; H05K 7/1497; H05K 7/20745; H05K 7/20836; H05K 7/20736; G06F 1/20
USPC ............ 296/187.08, 187.12, 193.07, 203.01, 296/203.02, 203.03, 204
See application file for complete search history.

(56) References Cited

FOREIGN PATENT DOCUMENTS

| JP | 3-109174 A | 5/1991 |
|---|---|---|
| JP | 2008-94134 A | 4/2008 |
| JP | 2014-58279 A | 4/2014 |
| JP | 2015-93507 | 5/2015 |

*Primary Examiner* — Kiran B Patel
(74) *Attorney, Agent, or Firm* — Oblon, McClelland, Maier & Neustadt, L.L.P.

(57) ABSTRACT

A vehicle lower section structure that includes: a floor panel; a dash panel partitioning an engine compartment from a vehicle cabin; a front side member that extends in a vehicle body front-rear direction on a vehicle body front side of the dash panel, and that is disposed along a lower face of the floor panel on a vehicle body rear side of the dash panel; a rocker extending in the vehicle body front-rear direction; a torque box that extends in the vehicle width direction, that is joined to the lower face of the floor panel between the front side member and the rocker in bottom face view, and that forms a closed cross-section profile together with the floor panel; and a bulkhead running along the vehicle body front-rear direction inside the torque box and sectioning the inside of the torque box in the vehicle width direction.

6 Claims, 9 Drawing Sheets

VEHICLE LOWER SECTION STRUCTURE

CROSS-REFERENCE TO RELATED APPLICATION

This application is based on and claims priority under 35 USC 119 from Japanese Patent Application No. 2015-205881 filed on Oct. 19, 2015, the disclosure of which is incorporated by reference herein.

BACKGROUND

Technical Field

The present disclosure relates to a vehicle lower section structure.

Related Art

Vehicle lower section structures are known in which an inside of a torque box is sectioned, front and rear, by a reinforcement member in side cross-section view as viewed along a vehicle width direction (for example, see Japanese Patent Application Laid-Open (JP-A) No. 2015-93507).

However, there is still room for improvement regarding structures that effectively suppress plastic deformation of a torque box in cases in which load has been input from a front wheel to the torque box in a small overlap collision in which a vehicle width direction outside end portion of front bumper reinforcement is involved in a frontal collision further to the vehicle width direction outside than a front side member.

SUMMARY

The present disclosure provides a vehicle lower section structure capable of effectively suppressing plastic deformation of a torque box in a small overlap collision.

In order to achieve the above object, a vehicle lower section structure of a first aspect of the present disclosure includes a floor panel that configures a floor of a vehicle, a dash panel that extends from a front end portion of the floor panel toward a vehicle body upper side, and that partitions an engine compartment from a vehicle cabin, a front side member that extends in a vehicle body front-rear direction on a vehicle body front side of the dash panel, and that is disposed along a lower face of the floor panel on a vehicle body rear side of the dash panel, a rocker that extends in the vehicle body front-rear direction at a vehicle width direction outside of the floor panel, a torque box that extends in the vehicle width direction, that is joined to the lower face of the floor panel between the front side member and the rocker in bottom face view, and that forms a closed cross-section profile together with the floor panel, and a bulkhead that is provided running along the vehicle body front-rear direction inside the torque box, and that sections the inside of the torque box in the vehicle width direction.

According to the first aspect of the present disclosure, in bottom view, the torque box that forms a closed cross-section profile together with the floor panel is joined to the lower face of the floor panel between the front side member and the rocker. The bulkhead is provided running along the vehicle body front-rear direction inside the torque box, and the bulkhead sections the inside of the torque box in the vehicle width direction.

Accordingly, plastic deformation of the torque box is effectively suppressed by the bulkhead in a small overlap collision, even when collision load is input to the torque box from the vehicle body front side.

A vehicle lower section structure of a second aspect of the present disclosure is the vehicle lower section structure of the first aspect, wherein the bulkhead is provided at a location opposing an inside rim of a front wheel along the vehicle body front-rear direction.

According to the second aspect of the present disclosure, the bulkhead is provided at a location opposing the inside rim of a front wheel along the vehicle body front-rear direction. Thus, intrusion into the vehicle cabin side of the front wheel being relatively knocked back toward the torque box side in a small overlap collision is effectively suppressed by the bulkhead. Note that the present disclosure also encompasses configurations in which the bulkhead is provided at a location opposing, along the vehicle body front-rear direction, the inside rim of the front wheel being relatively knocked back in a small overlap collision.

A vehicle lower section structure of a third aspect of the present disclosure is the vehicle lower section structure of the first aspect or the second aspect, wherein the bulkhead includes a bead portion running along the vehicle body front-rear direction.

According to the third aspect of the present disclosure, the bulkhead includes the bead portion running along the vehicle body front-rear direction. Accordingly, the strength and the rigidity of the bulkhead with respect to collision load input from the vehicle body front side in a small overlap collision or the like are improved.

A vehicle lower section structure of a fourth aspect of the present disclosure is the vehicle lower section structure of any one of the first aspect to the third aspect, further including a dash cross member that extends in the vehicle width direction, that is joined to an upper face of the floor panel overlapping with the bulkhead in the vehicle body up-down direction in side view, and that forms a closed cross-section profile together with the floor panel.

According to the fourth aspect of the present disclosure, the dash cross member forming a closed cross-section profile together with the floor panel is joined to an upper face of the floor panel overlapping with the bulkhead in the vehicle body up-down direction in side view. Accordingly, in a small overlap collision, collision load input to the bulkhead is efficiently dispersed from the bulkhead, through the dash cross member, and into the floor panel.

According to the first aspect of the present disclosure, plastic deformation of the torque box can be can be effectively suppressed in a small overlap collision.

According to the second aspect of the present disclosure, intrusion into the vehicle cabin side of the front wheel being relatively knocked back toward the torque box side in a small overlap collision is effectively suppressed by the bulkhead.

According to the third aspect of the present disclosure, the strength and rigidity of the bulkhead with respect to collision load input from the vehicle body front side in a small overlap collision or the like can be improved.

According to the fourth aspect of the present disclosure, collision load input to the bulkhead in a small overlap collision can be efficiently dispersed from the bulkhead, through the dash cross member, and into the floor panel.

BRIEF DESCRIPTION OF THE DRAWINGS

Exemplary embodiments of the present disclosure will be described in detail based on the following figures, wherein.

DETAILED DESCRIPTION

Detailed explanation follows regarding an exemplary embodiment according to the present disclosure, based on the drawings. Note that for ease of explanation, the arrow UP indicates a vehicle body upward direction, the arrow FR indicates a vehicle body front direction, and the arrow RH indicates a vehicle body right direction in each of the drawings as appropriate. In the explanation below, unless specifically stated otherwise, reference to the up-down, front-rear, and left-right directions indicates up-down in a vehicle body up-down direction, front-rear in a vehicle body front-rear direction, and left-right in a vehicle body left-right direction (vehicle width direction). Moreover, although the right side of a vehicle is illustrated in each of the drawings, the left side of the vehicle is similar, with left-right symmetry thereto.

Figure 1:
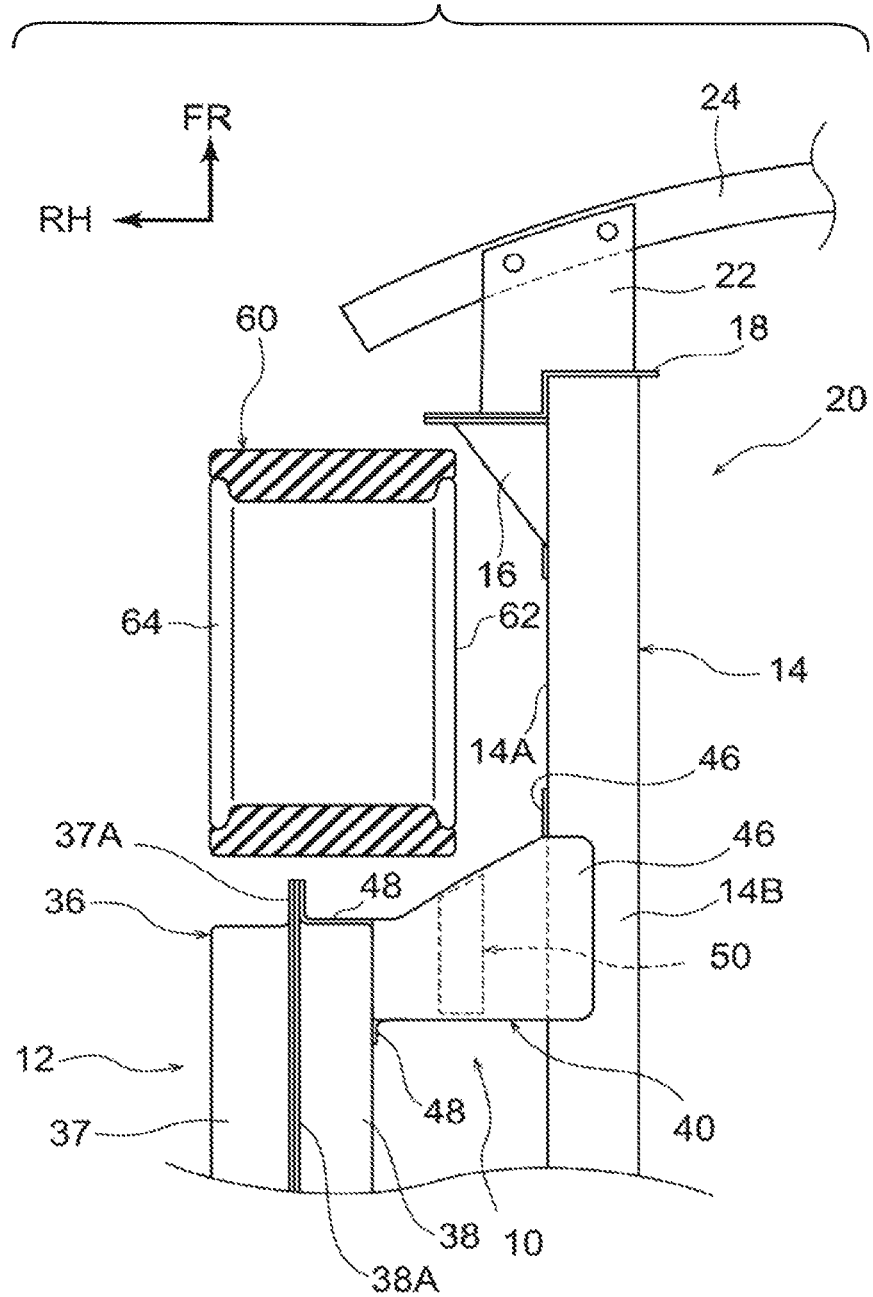
FIG. 1 is a bottom face view illustrating configuration of a vehicle lower section structure according to an exemplary embodiment.

As illustrated in FIG. 1, a pair of left and right front side members 14 extending in the vehicle body front-rear direction are respectively provided at a front section side of a vehicle 12 that includes a vehicle lower section structure 10 according to the present exemplary embodiment. Each front side member 14 is formed with a rectangular closed cross-section profile. A gusset 16 with a substantially right-angled triangular shape in plan view is respectively joined to an outer wall 14A at a front end portion of each front side member 14.

A front end face of each gusset 16 is positioned slightly further to the vehicle body rear side than a front end face of the respective front side member 14. The front end face of each front side member 14 and the front end face of each gusset 16 are respectively coupled together by a coupling plate 18. A rear end portion of a crash box 22 formed with a rectangular closed cross-section profile is joined to each coupling plate 18, and front bumper reinforcement 24 having a rectangular closed cross-section profile extending in substantially the vehicle width direction is provided spanning the front end portions of the respective crash boxes 22.

Figure 2:
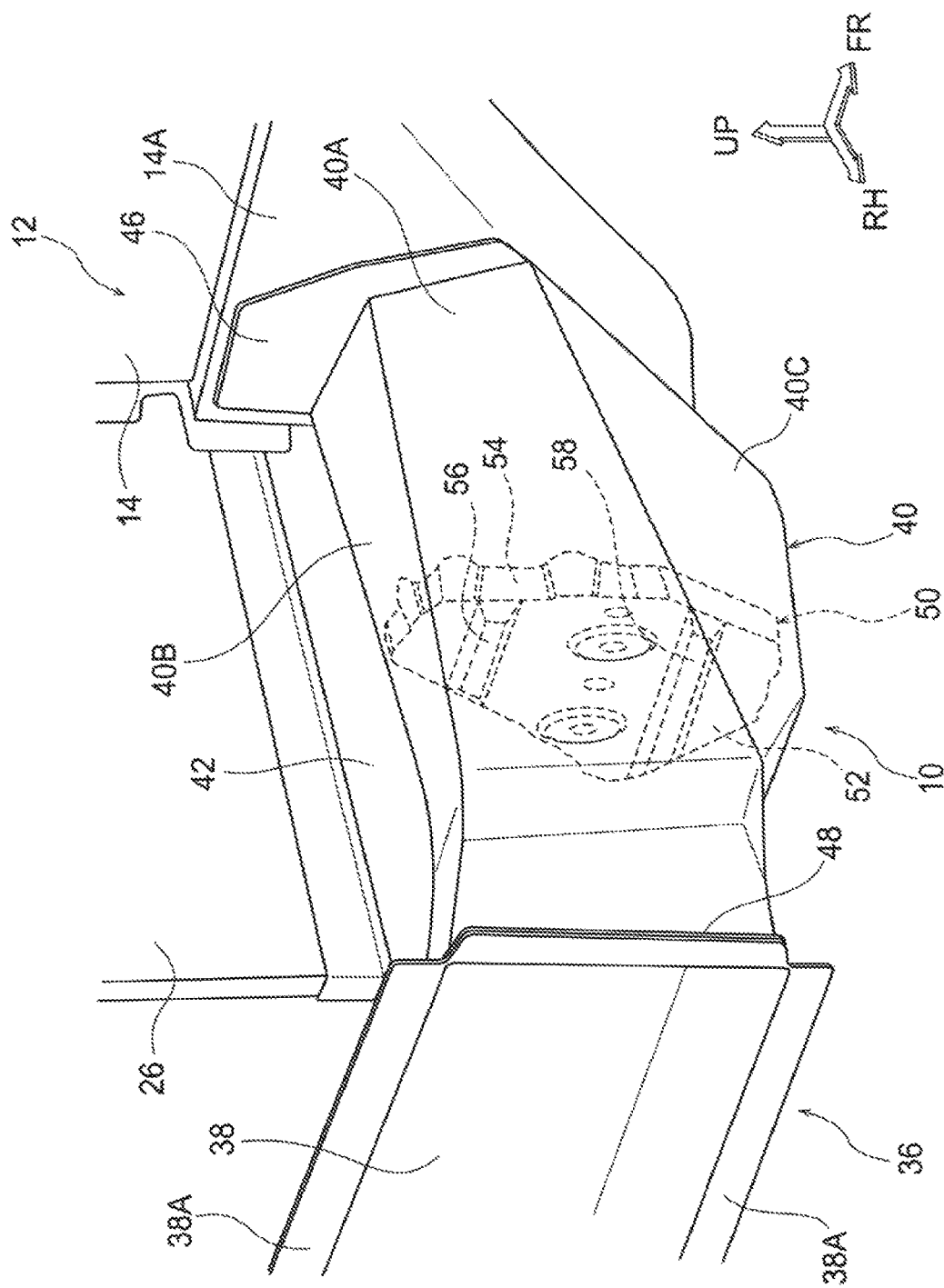
FIG. 2 is a perspective view illustrating configuration of a vehicle lower section structure according to the present exemplary embodiment.
Figure 3:
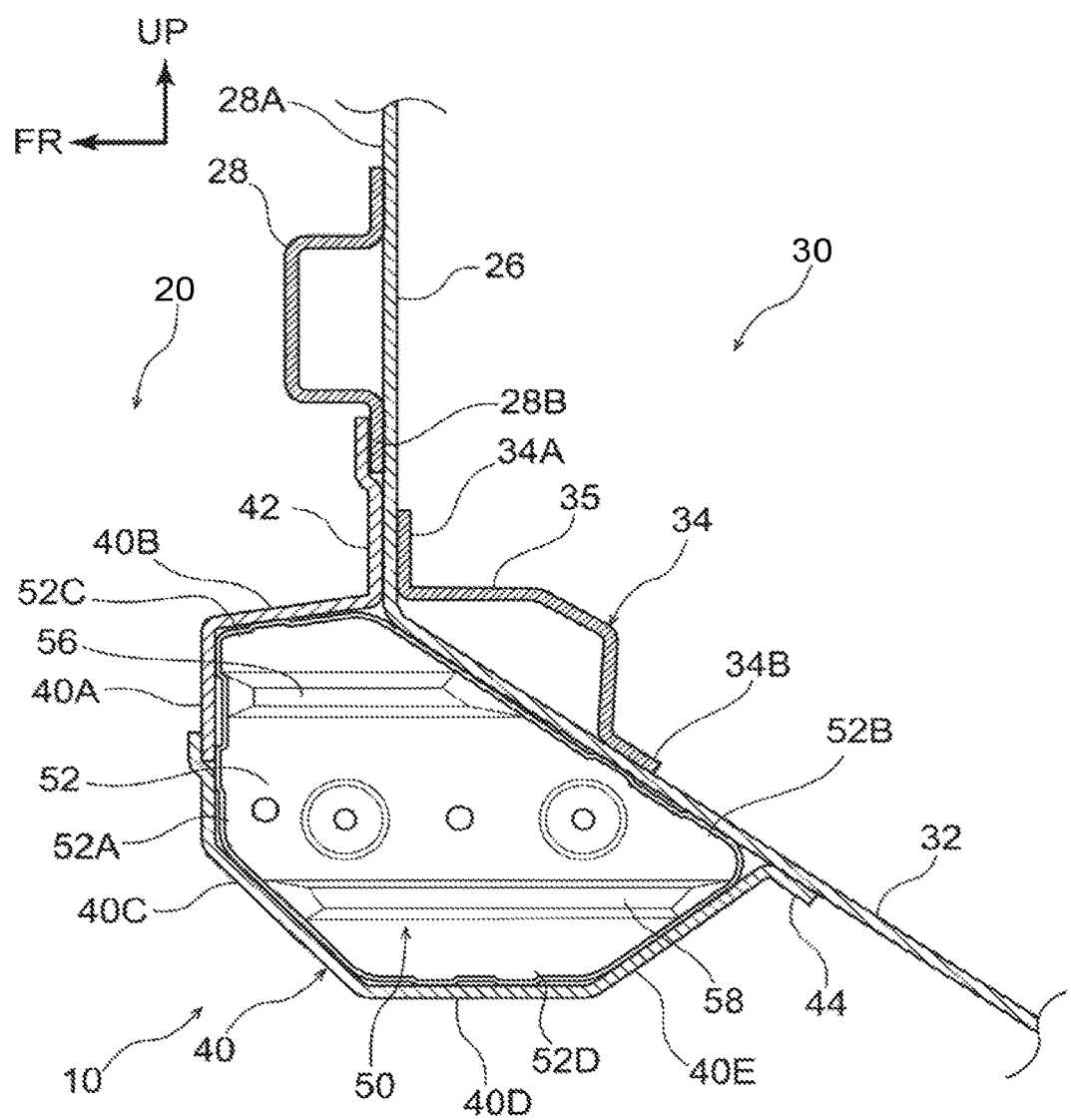
FIG. 3 is a cross-sectional view of the vehicle lower section structure according to the present exemplary embodiment as viewed along the vehicle width direction.

In plan view (bottom face view), a space surrounded by the front bumper reinforcement 24 and the pair of left and right front side members 14 configures an engine compartment 20 in which an engine or the like, not illustrated in the drawings, is disposed. As illustrated in FIG. 2 and FIG. 3, a substantially flat plate shaped dash panel 26 partitioning the engine compartment 20 from a vehicle cabin 30 is installed at the vehicle body rear side of the engine compartment 20.

A substantially flat plate shaped floor panel 32 configuring the floor of the vehicle 12 is integrally and continuously provided from a lower end portion of the dash panel 26 toward the vehicle body rear side. Namely, the dash panel 26 extending toward the vehicle body upper side is integrally and continuously provided to a front end portion of the floor panel 32. The pair of left and right front side members 14 extend in the vehicle body front-rear direction on a vehicle body front side of the dash panel 26, and are disposed along a lower face of the floor panel 32 on a vehicle body rear side of the dash panel 26.

As illustrated in FIG. 3, an upper dash cross member 28 extending in the vehicle width direction is joined to the dash panel 26 at a front face that faces toward the vehicle body front side. The upper dash cross member 28 is formed with a hat shaped cross-section profile, and an upper flange 28A and a lower flange 28B of the upper dash cross member 28 are respectively joined to the front face of the dash panel 26 by welding. Accordingly, the upper dash cross member 28 forms a closed cross-section profile together with the dash panel 26.

A lower dash cross member 34, serving as a dash cross member extending in the vehicle width direction, is joined to an upper face of the front end portion of the floor panel 32 that is integrally and continuously provided to the lower end portion of the dash panel 26. The lower dash cross member 34 is formed with a hat shaped cross-section profile, and an upper flange 34A and a lower flange 34B are respectively joined to the upper face of the floor panel 32 by welding. Accordingly, the lower dash cross member 34 forms a closed cross-section profile with the floor panel 32.

As illustrated in FIG. 1 and FIG. 2, rockers 36 extending in the vehicle body front-rear direction are provided at the vehicle width direction outsides of the floor panel 32. Each rocker 36 is formed with a rectangular closed cross-section profile by joining together a flange 37A of an outer panel 37 configured with a hat shaped cross-section profile, and a flange 38A of an inner panel 38 configured with a hat shaped cross-section profile, by welding. Vehicle width direction outside end portions of the floor panel 32 are joined to the inner panels 38 of the rockers 36.

In bottom face view, torque boxes 40 extending in the vehicle width direction are joined to the lower face of the floor panel 32, between the front side members 14 and the rockers 36 (inner panels 38). As illustrated in FIG. 3, each torque box 40 is formed with a substantially hat shaped cross-section profile. An upper flange 42 and a lower flange 44 of the torque box 40 are respectively joined to the lower face of the floor panel 32 by welding.

Accordingly, the torque box 40 forms a closed cross-section profile together with the floor panel 32. Note that the torque box 40 includes a front wall 40A facing toward the vehicle body front side, an upper wall 40B facing toward the vehicle body upper side, a front inclined wall 40C inclined from the front wall 40A toward the vehicle body lower rear side, a lower wall 40D that is continuous from the front inclined wall 40C and that faces toward the vehicle body lower side, and a rear inclined wall 40E that is continuous from the lower wall 40D and that is inclined toward the vehicle rear upper side.

As illustrated in FIG. 2, an inner flange 46 is formed to a vehicle width direction inside end portion of the torque box 40. The inner flange 46 is joined to the outer wall 14A and a lower wall 14B of the front side member 14 by welding. An outer flange 48 is formed to a vehicle width direction outside end portion of the torque box 40. The outer flange 48 is joined to the inner panel 38 of the rocker 36 by welding.

Moreover, a bulkhead 50 sectioning the inside of the torque box 40 in the vehicle width direction is provided inside the torque box 40. As illustrated in FIG. 1 to FIG. 6, the bulkhead 50 includes a bulkhead main body 52 having a substantially flat plate shape that is the same shape as the closed cross-section profile of the torque box 40 (see FIG. 3), and a flange 54 that is integrally formed projecting out from a peripheral edge portion of the bulkhead main body 52 toward the vehicle width direction inside. The bulkhead 50 is disposed running along the vehicle body front-rear direction inside the torque box 40, such that a direction normal to the bulkhead main body 52 runs along the vehicle width direction.

Figure 4:
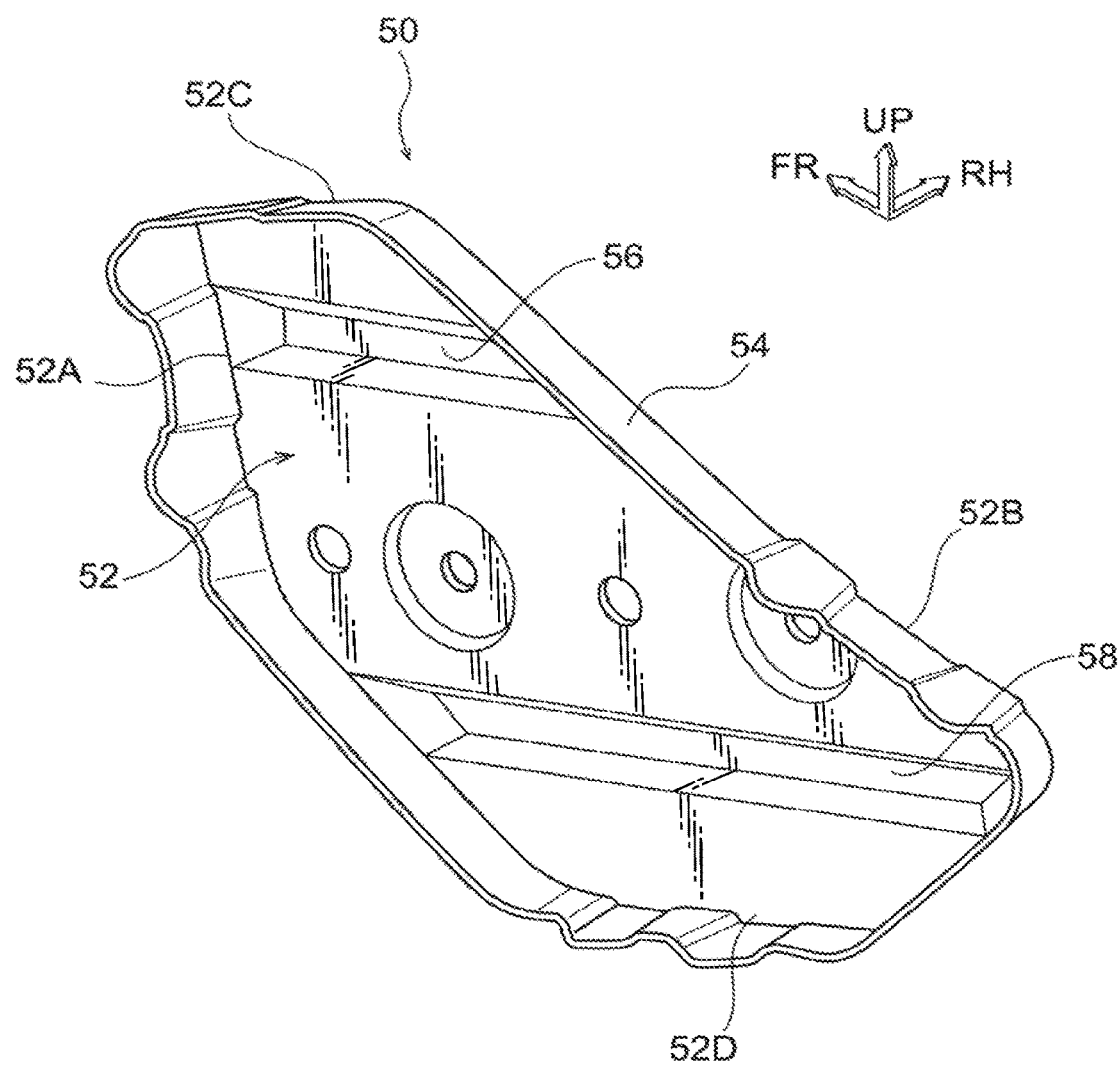
FIG. 4 is a perspective view of a bulkhead configuring a vehicle lower section structure according to the present exemplary embodiment.
Figure 5:
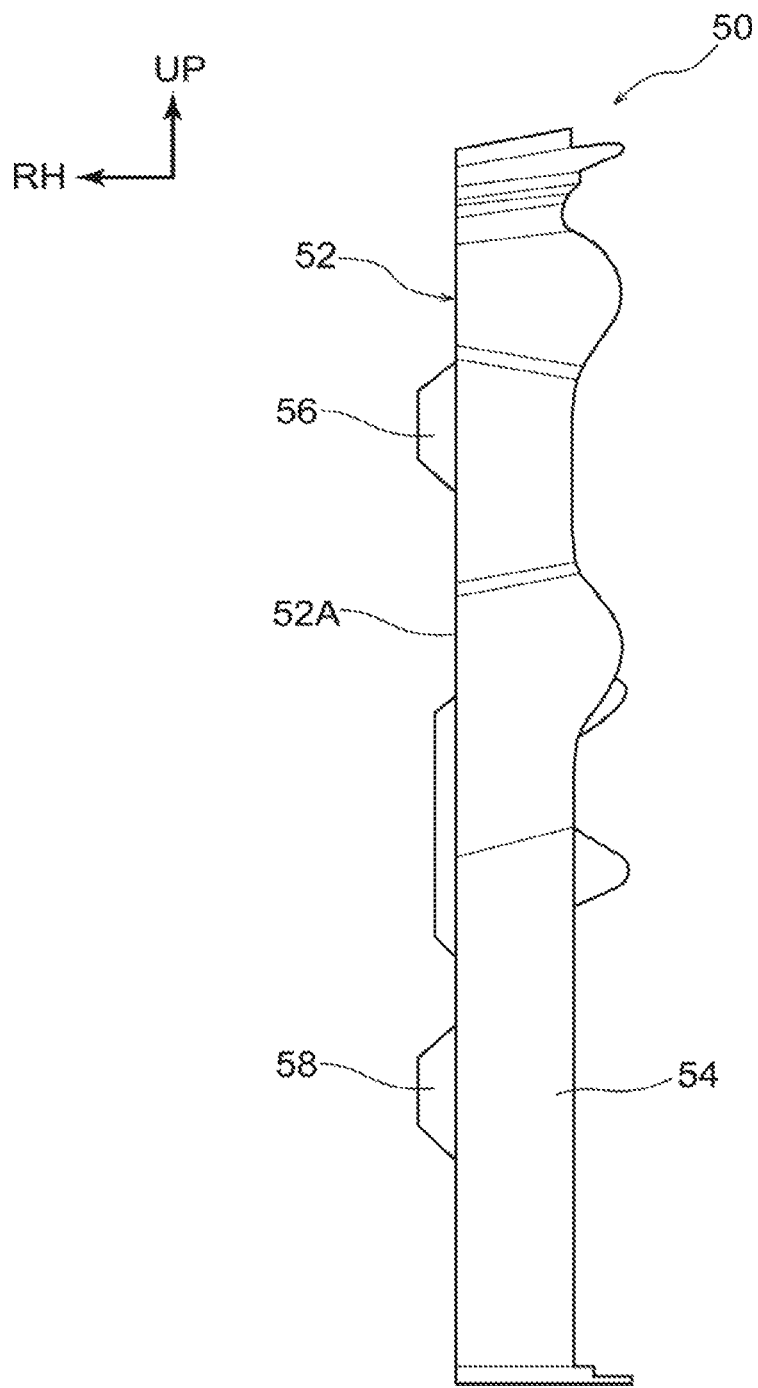
FIG. 5 is a front view of a bulkhead configuring a vehicle lower section structure according to the present exemplary embodiment.
Figure 6:
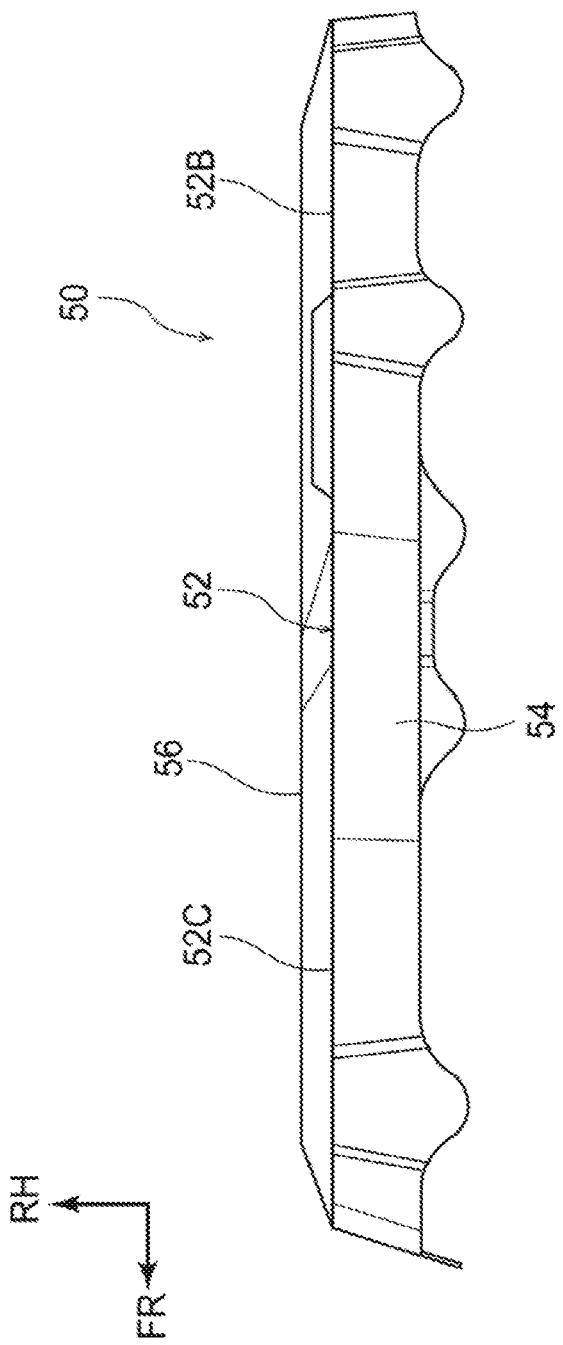
FIG. 6 is a plan view of a bulkhead configuring a vehicle lower section structure according to the present exemplary embodiment.

As illustrated in FIG. 3 and FIG. 4, as viewed from the side, the bulkhead main body 52 includes a front end portion 52A disposed running along the vehicle body up-down direction (front wall 40A), a rear end portion 52B disposed running toward a vehicle body lower rear side, an upper end portion 52C that is disposed at an upper side of the front end portion 52A and the rear end portion 52B and that runs along the vehicle body front-rear direction (upper wall 40B), and a lower end portion 52D that is disposed at a lower side of the front end portion 52A and the rear end portion 52B and that runs toward the vehicle body lower rear side (along the front inclined wall 40C), along the vehicle body front-rear direction (along the lower wall 40D), and toward a vehicle body rear upper side (along the rear inclined wall 40E).

As illustrated in FIG. 1, the bulkhead 50 opposes an inside rim 62 of a front wheel 60 in the vehicle body front-rear direction, and is fixed inside the torque box 40 at a specific position (a substantially central portion in the vehicle width direction). Namely, as illustrated in FIG. 3, at the front end portion 52A, the upper end portion 52C, and the lower end portion 52D of the bulkhead main body 52, the flange 54 is respectively joined to an inner face of the front wall 40A, an inner face of the upper wall 40B, an inner face of the front inclined wall 40C, an inner face of the lower wall 40D, and an inner face of the rear inclined wall 40E of the torque box 40 by welding.

As illustrated in side cross-section view in FIG. 3, the front end portion of the floor panel 32 is inclined at a predetermined angle from the lower end portion of the dash panel 26 toward the vehicle body lower rear side. Thus, the rear end portion 52B of the bulkhead main body 52 disposed along the lower face of the front end portion of the floor panel 32 is inclined from the rear side of the upper end portion 52C of the bulkhead main body 52 toward the vehicle lower rear side at the same angle as the front end portion of the floor panel 32. At the rear end portion 52B of the bulkhead main body 52, the flange 54 abuts the lower face of the floor panel 32.

An upper side and a lower side of the bulkhead main body 52 of the bulkhead 50 respectively include bead portions 56, 58 extending in the vehicle body front-rear direction. Each bead portion 56, 58 is respectively configured as a protruding bead with a rectangular cross-section profile that protrudes out toward the vehicle width direction outside, and is integrally formed to the bulkhead main body 52. Note that the bead portion 56 at the upper side is formed spanning from the front end portion 52A to the rear end portion 52B, and the bead portion 58 at the lower side is formed spanning between a portion of the lower end portion 52D inclined toward the vehicle body lower rear side, and a portion of the lower end portion 52D inclined toward the vehicle body upper rear side.

As illustrated in FIG. 3, in side cross-section view as viewed along the vehicle width direction, the lower dash cross member 34 is disposed at a position overlapping the bulkhead 50 in the vehicle body up-down direction. Namely, the lower flange 34B of the lower dash cross member 34 opposes the flange 54 at the rear end portion 52B of the bulkhead main body 52, with the floor panel 32 interposed therebetween.

The upper flange 34A of the lower dash cross member 34 opposes the upper flange 42 of the torque box 40, with the dash panel 26 interposed therebetween, and an upper wall 35 of the lower dash cross member 34 that faces toward the vehicle body upper side is disposed at a position at substantially the same height as the upper wall 40B of the torque box 40 and the upper end portion 52C of the bulkhead main body 52.

Next, explanation follows regarding operation of the vehicle lower section structure 10 according to the present exemplary embodiment configured as described above.

Note that in the present exemplary embodiment, explanation is given regarding an example of a small overlap collision in which a right end portion (vehicle width direction outside end portion) of the front bumper reinforcement 24 that is positioned further to the vehicle width direction outside than the crash box 22 provided to the front end portions of the front side member 14 and the gusset 16 at the right side of the vehicle 12 collides with a barrier W.

Figure 7:
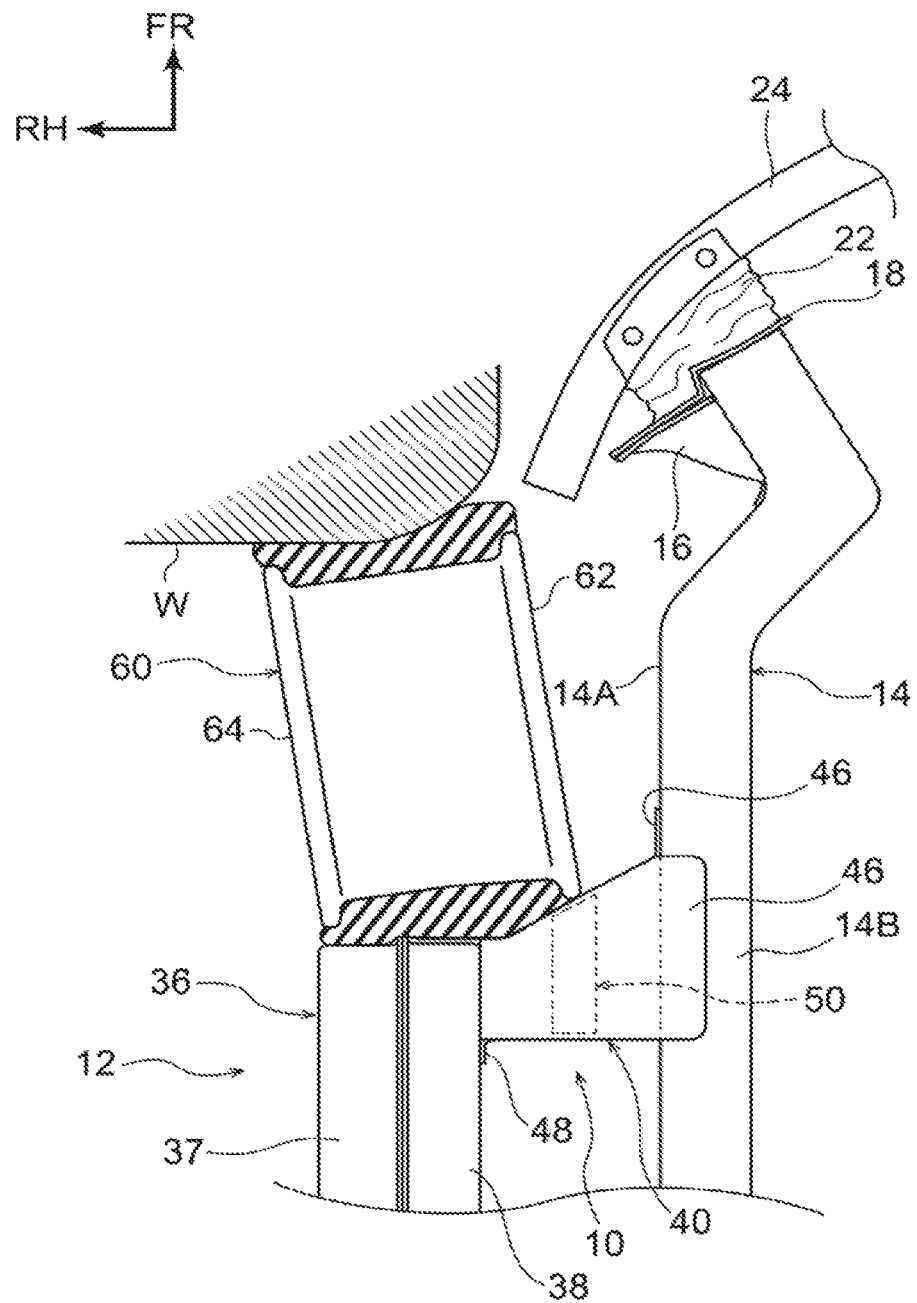
FIG. 7 is a bottom face view illustrating a state of a vehicle lower section structure according to the present exemplary embodiment during a small overlap collision.

As illustrated in FIG. 7, in a small overlap collision of the vehicle 12 with the barrier W, the crash box 22 undergoes compression deformation in its axial direction, thereby absorbing part of the collision load. Then, part of the remaining collision load that was not completely absorbed by the crash box 22 is absorbed by inward folding of the front side member 14 (folding deformation toward the vehicle width direction inside in plan view).

Moreover, when the vehicle 12 is involved in a small overlap collision, the front wheel 60 collides with the barrier W. When this occurs, the front wheel 60 is pressed by the barrier W and is knocked back toward the side of the rocker 36 and the lower dash cross member 34 relative to the barrier W. Collision load is input to the front end portion of the rocker 36 and the torque box 40 from the vehicle body front side by the front wheel 60.

First, explanation follows regarding a vehicle lower section structure according to a comparative example illustrated in FIG. 9. In the vehicle lower section structure according to the comparative example, configuration is made in which the bulkhead 50 is not provided inside the torque box 40.

Figure 9A:
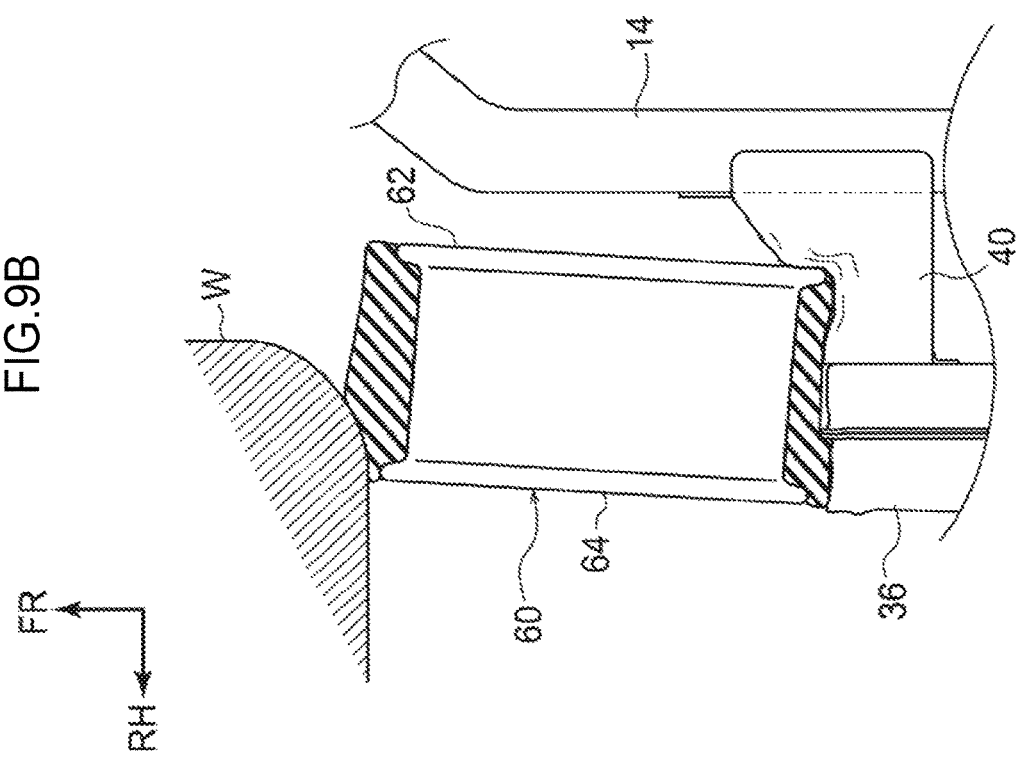
FIG. 9A is bottom face view illustrating a state of a vehicle lower section structure according to a comparative example during a small overlap collision.
Figure 9B:
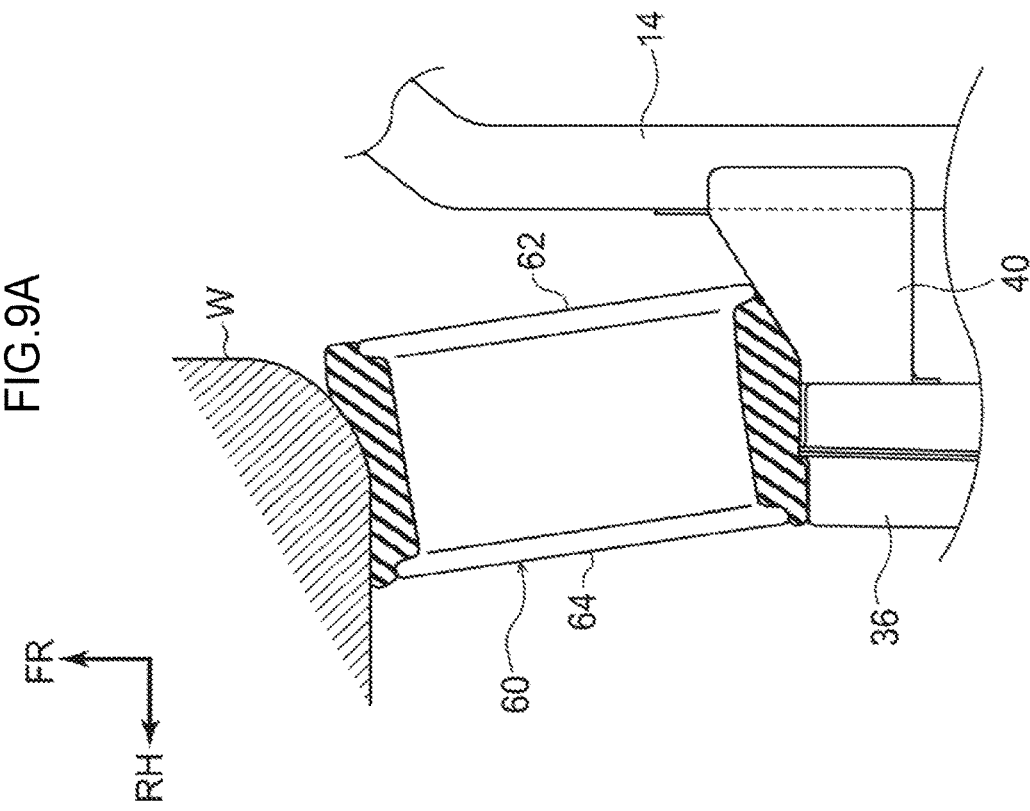
FIG. 9B is bottom face view illustrating a state of a vehicle lower section structure according to the comparative example following a small overlap collision.

Thus, as illustrated in FIG. 9A, when the front wheel 60 is relatively knocked back and collision load is input to the front end portion of the rocker 36 and the torque box 40 by the front wheel 60, as illustrated in FIG. 9B, the front end portion of the rocker 36 undergoes compression deformation in its axial direction due to an outside rim 64 of the front wheel 60, and the vehicle width direction substantially central portion of the torque box 40 is crushed (undergoes plastic deformation) toward the vehicle body rear side due to the inside rim 62 of the front wheel 60.

Namely, the vehicle lower section structure according to the comparative example is a structure in which suppressing plastic deformation of the torque box 40 is difficult. Accordingly, in the vehicle lower section structure according to the comparative example, the front wheel 60 could move toward the vehicle width direction inside while being pressed relatively from the vehicle body front side by the barrier W. Namely, the front wheel 60 could move toward the vehicle cabin 30 side, and the dash panel 26 could be deformed by the front wheel 60.

By contrast, in the vehicle lower section structure 10 according to the present exemplary embodiment, the bulkhead 50 sectioning the inside of the torque box 40 in the vehicle width direction is provided running along the vehicle body front-rear direction at a location inside the torque box 40 opposing the inside rim 62 of the front wheel 60 in the vehicle body front-rear direction. This thereby enables plastic deformation of the torque box 40 to be effectively suppressed. Explanation follows regarding this point.

Figure 8:
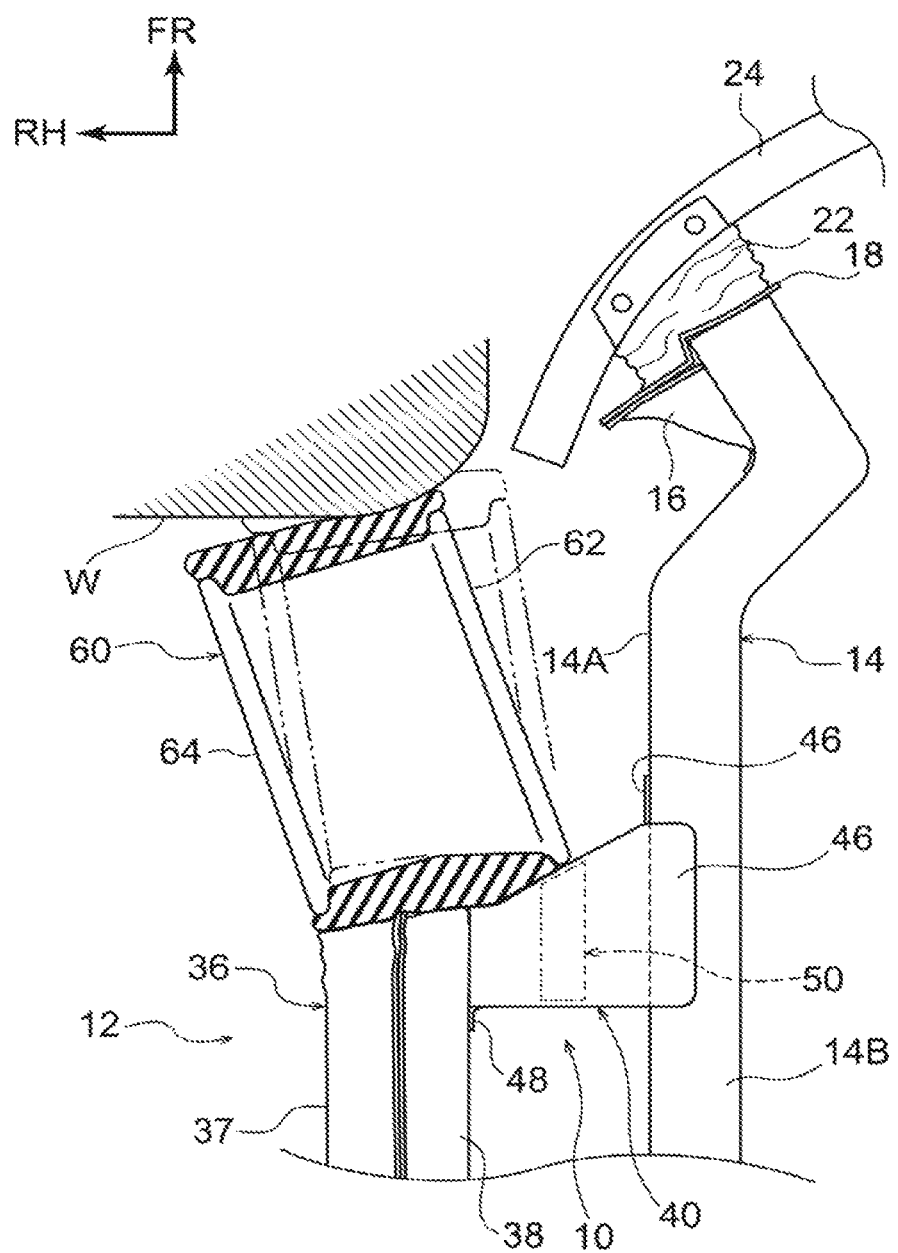
FIG. 8 is a bottom face view illustrating a state of a vehicle lower section structure according to the present exemplary embodiment following a small overlap collision.

As illustrated in FIG. 7, when the front wheel 60 is relatively knocked back and collision load is input to the front end portion of the rocker 36 and the torque box 40 by the front wheel 60, as illustrated in FIG. 8, the front end portion of the rocker 36 undergoes compression deformation along its axial direction due to the outside rim 64 of the front wheel 60. However, the inside rim 62 of the front wheel 60 is prevented from being knocked back by the bulkhead 50 provided inside the torque box 40.

To explain in detail, the bulkhead 50 includes the bead portions 56, 58 running along the vehicle body front-rear direction at the upper side and the lower side of the bulkhead main body 52. The bulkhead 50 accordingly has high strength and rigidity, particularly with respect to collision load input from the vehicle body front side. Accordingly, the bulkhead 50 enables relative knocking back of the inside rim 62 of the front wheel 60 to be effectively prevented, and enables plastic deformation of the vehicle width direction substantially central portion of the torque box 40 to be effectively suppressed.

Since the front wheel 60 moves toward the vehicle width direction outside while being pressed relatively from the vehicle body front side by the barrier W, there is no concern of the front wheel 60 moving toward the vehicle cabin 30 side. Namely, intrusion into the vehicle cabin 30 side of the front wheel 60 being relatively knocked back is effectively suppressed by the bulkhead 50. Accordingly, there is no concern of the dash panel 26 being deformed by the front wheel 60. Thus, deformation on the vehicle cabin 30 side can be suppressed or prevented in a small overlap collision involving the vehicle 12.

As described above, in side cross-section view as viewed along the vehicle width direction, the lower dash cross member 34 forming a closed cross-section profile together with the floor panel 32 and extending in the vehicle width direction, is joined to the upper face of the front end portion of the floor panel 32 overlapping with the bulkhead 50 in the vehicle body up-down direction (see FIG. 3).

Accordingly, in a small overlap collision, collision load input from the inside rim 62 of the front wheel 60 to the bulkhead 50 is efficiently dispersed from the bulkhead 50, through the lower dash cross member 34, and into the floor panel 32. Accordingly, plastic deformation of the torque box 40 can be even further suppressed, and deformation on the vehicle cabin 30 side can be even further suppressed or prevented.

Explanation has been given above regarding the vehicle lower section structure 10 according to the present exemplary embodiment based on the drawings. However, the vehicle lower section structure 10 according to the present exemplary embodiment is not limited by the drawings, and appropriate design modifications may be made within a range not departing from the spirit of the present disclosure. For example, explanation has been given in which the vehicle lower section structure 10 according to the present exemplary embodiment is configured with left-right symmetry; however, the vehicle lower section structure 10 may be configured without left-right symmetry.

Moreover, in bottom face view, there may be a slight offset between the inside rim 62 and the bulkhead 50 in the vehicle width direction when the front wheel 60 is assembled to the vehicle body, as long as the bulkhead 50 is disposed inside the torque box 40 at a location that opposes, in the vehicle body front-rear direction, the inside rim 62 of the front wheel 60 being relatively knocked back at least when the vehicle 12 is involved in a small overlap collision.

A weakened portion in which compression deformation is promoted along an axial direction, for example, a recessed bead portion running around the entire peripheral direction (not illustrated in the drawings), may be formed to the front end portion of the rocker 36 that is struck by the outside rim 64 when the front wheel 60 has been relatively knocked back. Moreover, configuration may be made in which the bead portions 56, 58 running along the vehicle body front-rear direction at the upper side and the lower side of the bulkhead main body 52 are not formed, so long as the strength and rigidity of the bulkhead 50 (bulkhead main body 52) with respect to collision load input from the vehicle body front side can be sufficiently secured.

Moreover, configuration may be made in which the lower dash cross member 34 does not overlap with the bulkhead 50 in the vehicle body up-down direction in side cross-section view as viewed along the vehicle width direction, so long as configuration is made in which collision load input to the bulkhead 50 is efficiently dispersed into the floor panel 32 through the lower dash cross member 34.

Moreover, although the bulkhead 50 is provided so as to block off the closed cross-section of the torque box 40, the bulkhead 50 may be formed in a shape such that a portion of the closed cross-section of the torque box 40 is not blocked. Specifically, a penetrating hole (not illustrated in the drawings) may be formed in the bulkhead main body 52, for example, or a cutout portion (not illustrated in the drawings) may be formed in the peripheral edge portion of the bulkhead main body 52, such that a flange 54 that does not contact the inner face of torque box 40 is present.

At the rear end portion 52B of the bulkhead main body 52, the flange 54 is not limited to a configuration abutting the lower face of the floor panel 32. Configuration may be made in which there is a slight gap between the flange 54 and the lower face of the floor panel 32. Namely, it is sufficient that at the rear end portion 52B of the bulkhead main body 52, the flange 54 is configured so as to abut the lower face of the floor panel 32 when collision load is input to the bulkhead 50 from the vehicle body front side.

What is claimed is:
1. A vehicle lower section structure comprising:
    a floor panel that configures a floor of a vehicle;
    a dash panel that extends from a front end portion of the floor panel toward a vehicle body upper side, and that partitions an engine compartment from a vehicle cabin;
    a front side member that extends in a vehicle body front-rear direction on a vehicle body front side of the dash panel, and that is disposed along a lower face of the floor panel on a vehicle body rear side of the dash panel;

a rocker that extends in the vehicle body front-rear direction at a vehicle width direction outside of the floor panel;

a torque box that extends in the vehicle width direction, that is joined to the lower face of the floor panel between the front side member and the rocker in bottom face view, and that forms a closed cross-section profile together with the floor panel; and a bulkhead that is provided running along the vehicle body front-rear direction inside the torque box, and that sections the inside of the torque box in the vehicle width direction.

2. The vehicle lower section structure of claim 1, wherein the bulkhead is provided at a location opposing, along the vehicle body front-rear direction, an inside rim of a front wheel.

3. The vehicle lower section structure of claim 1, wherein the bulkhead includes a bead portion running along the vehicle body front-rear direction.

4. The vehicle lower section structure of claim 1, further comprising a dash cross member that extends in the vehicle width direction, that is joined to an upper face of the floor panel overlapping with the bulkhead in the vehicle body up-down direction in side view, and that forms a closed cross-section profile together with the floor panel.

5. The vehicle lower section structure of claim 4, wherein bead portions are provided at an upper side and a lower side of the bulkhead respectively so as to extend in the vehicle body front-rear direction.

6. The vehicle lower section structure of claim 5, wherein each of the bead portions is configured as a protruding bead with a rectangular cross-section profile that protrudes out toward the vehicle width direction outside, and is integrally formed to the bulkhead.

* * * * *